Feb. 6, 1962   L. W. HAERTHER ETAL   3,019,532
AIRCRAFT APPROACH HORIZON INSTRUMENT
Filed May 31, 1957   3 Sheets-Sheet 1

INVENTOR.
LESTER W. HAERTHER
HANS I. WALKER
BY
Marvin Moody
ATTORNEY

INVENTOR.
LESTER W. HAERTHER
HANS I. WALKER
BY
Marvin Moody
ATTORNEY

United States Patent Office 3,019,532
Patented Feb. 6, 1962

3,019,532
AIRCRAFT APPROACH HORIZON INSTRUMENT
Lester W. Haerther and Hans I. Walker, Cedar Rapids, Iowa, assignors to Collins Radio Company, Cedar Rapids, Iowa, a corporation of Iowa
Filed May 31, 1957, Ser. No. 662,800
4 Claims. (Cl. 33—204)

This invention relates in general to aircraft guidance and more particularly to an aircraft instrument of the type displaying basic aircraft attitude together with relative position of glide slope and/or vertical guidance and flight director steering information into which are incorporated relaying motion transmitters which serve as primary aircraft attitude repeater reference devices and may be used to supply basic vertical gyro (or equivalent) attitude reference signals to associated equipment in varying degrees of flexibility.

It is a feature of this invention to provide electro-mechanical means of incorporating pitch trim into a pitch attitude indication along with the basic pitch attitude as derived from a vertical reference device (gyro or equivalent) in such a manner that the relaying motion transmitters will supply electrical output information indicative of the attitude reference input and are not affected by the pitch trim parameter.

It is well known in the art that aircraft indicators which include a pitch indication generally include means for introducing pitch trim. This is necessary since the basic pitch attitude indication, as derived from a vertical gyro for example, must be modified in accordance with the particular trim characteristics of an aircraft such that the proper pitch attitude will be maintained when the pitch indicator indicates a "zero" reference condition. It is to be realized that this indicated "zero" pitch condition will, in all probability, not be an aircraft attitude wherein the longitudinal axis of the aircraft is horizontal. Depending upon the flight characteristics of the particular aircraft, the "zeroed" pitch indication might correspond to a nose-up or nose-down attitude. Such aircraft instruments, therefore, have pitch trim means whereby the pitch attitude indication, as derived from a vertical gyro, for example, is modified by an amount of pitch trim such that the pilot in zeroing his pitch indicator is effecting the correct attitude indication to ensure horizontal flight. Numerous instruments have been designed in the art which display varying combinations of attitude indications to the pilot such as, for example, an instrument described in co-pending application, Serial Number 617,756, filed October 23, 1956, entitled "Flight Director Aircraft Instrument" by E. H. Fritze and H. M. Schweighofer, assignees to the assignor of the present invention. In this particular instrument, as in others known in the art, pitch trim is introduced electrically by inserting a biasing voltage into the pitch servo loop, which biasing voltage in effect moves the "zero" reference to some point other than the true horizontal attitude as indicated by the vertical gyro. Such servo loops and electrical pitch trim adjustments are known in the art and need not be discussed in detail herein. It is important to stress, however, that in systems where trim is introduced electrically into the pitch servo loop, there exist within the instrument itself no motion repeaters or transmitters which are maintained responsive to true pitch attitude. No mechanical shaft position or electrical signal indicative of shaft position exists in such instruments which is a true pitch indication. In all cases, the mechanical shaft position or pitch indication has been modified by the amount of pitch trim.

It is an object of this invention, therefore, to provide an instrument of the type employing servo positioning of attitude indicia wherein the basic servo loop is responsive at all times to true pitch as derived from a vertical reference system and pitch trim is differentially introduced such that the pitch indicia is responsive to the summation of the true pitch and pitch trim inputs, and the relaying motion transmitters remain indicative of true pitch at all times. The system then allows incorporation of relaying motion transmitters in the basic servo loops which may be used for auxiliary purposes as sources of true basic attitude.

It is a further object of this invention to provide an aircraft instrument which includes a mechanical pitch trim adjustment means which may automatically introduce a fixed pitch trim for certain modes of operation and additionally include means whereby an arbitrarily selected pitch trim may be inserted for other modes of operation. These and other features and objects of the invention will become apparent from the following discussion and claims when read in conjunction with the accompanying drawings in which:

Figure 1:
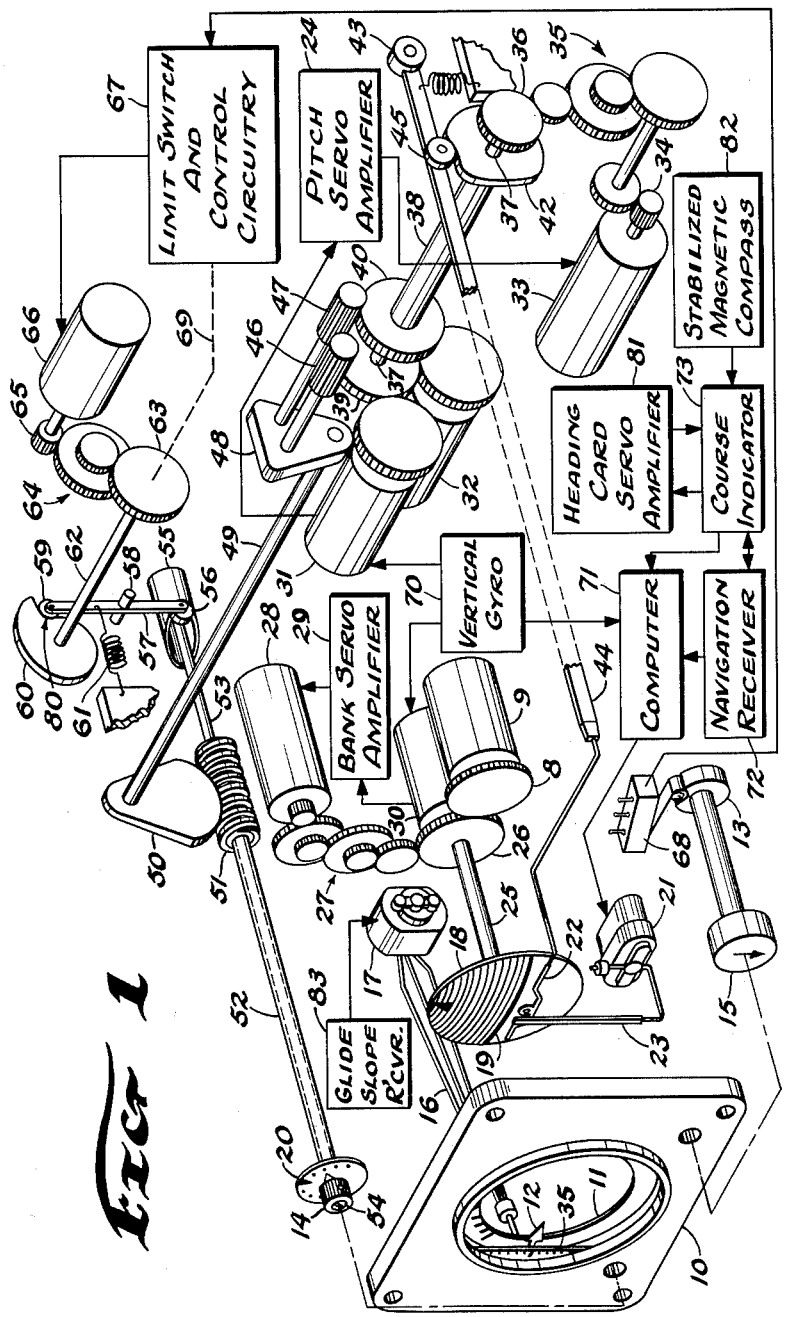
FIGURE 1 is a mechanical diagram of one form of this invention in an instrument together with a functional representation of basic signal sources for operation of the various indicia.

FIGURE 1 indicates functionally the mechanical structure of an instrument in which is incorporated means for mechanically introducing pitch trim. Details of the various indicia for the type of instrument illustrated are described in detail in the above-referenced co-pending application and will be but briefly described here. As indicated in FIGURE 1, the instrument comprises a front face member 10 provided with a circular window through which the flight situation is pictorially presented. A horizon disc member 18 is located concentrically within a mask member 11 behind the supporting member 10. The horizon disc is fixed to the shaft 25 of a bank motion repeater in the form of a synchro 30. Bank synchro 30 is tied in with a bank servo amplifier 29 and vertical gyro 70 such that its shaft position is at all times indicative of the bank attitude of the aircraft. Diametrically bisecting horizon disc 18 is a bar 19 which represents to the observer the horizon. The degree of bank is thus indicated by the degree of rotation of horizon disc 18 from a horizontal reference position, which degree may be directly read from reference indicia provided on mask member 11. The bank servo system employed is of a type well known in the art wherein any error in the position of the bank motion transmitting synchro rotor, with respect to a synchro reference in the gyro, is applied to bank servo amplifier 29, and the output from bank servo amplifier 29 energizes bank servo motor-generator 28 to position bank synchro 30 through a gear train, generally designated by reference numeral 27, to so position the rotor of bank synchro 30 that exact correspondence is realized with respect to the vertical gyro take-off. The position of the rotor shaft 25 of bank synchro 30 is then at all times indicative of the degree of bank or roll of the aircraft from a horizontal position. It is noted that the rotor of bank synchro 30 is positioned by the mesh of gear train 27 with gear 26 on the rotor shaft of bank synchro 30. A relaying motion transmitter in the form of synchro 9 has its rotor positioned by a mechanical drive between a gear 8 on its shaft and gear 26 on bank synchro 30. The gear ratio between gears 26 and 8 is one to one, and, therefore, the bank synchro 9 at all times will provide an electrical output indicative of bank attitude.

A second indicator on the instrument is in the form of a steering indicator 23 positioned by a meter movement 21. The deflection of steering indicator 23 provides a steering command presentation to the pilot such that zeroing the steering indicator 23 will maintain lateral guidance.

Additionally provided is a third indicator 12 which is positioned vertically with respect to a reference index 35 on supporting member 10 to indicate the degree of deviation of the aircraft from a radio-determined glide slop. Indicator 12 is seen to be attached to an arm 16 which is pivoted by glide slope meter 17. Meter 17 is energized from the output of a glide slope receiver 83.

A fourth indicator 22 is suggestive of an aircraft profile. The deviation of bar 22 from a zero-centered reference, as indicated by center reference mark 35 on supporting member 10, indicates the pitch attitude of the aircraft. Pitch bar 22 is seen to be activated by the vertical displacement of arm 44, which arm is pivoted about a point 43 through the co-operation of a cam follower 45 riding on cam 42. Cam 42 is affixed to a shaft 38, the rotational position of which is indicative of pitch attitude. As will be further discussed, this pitch attitude need not necessarily be true pitch as determined from a vertical gyro reference and is more generally indicative of true pitch modified by a degree of pitch trim which is introduced as necessary by the pilot depending upon the mode of flight operation being employed and the type of aircraft being flown.

Figure 4:
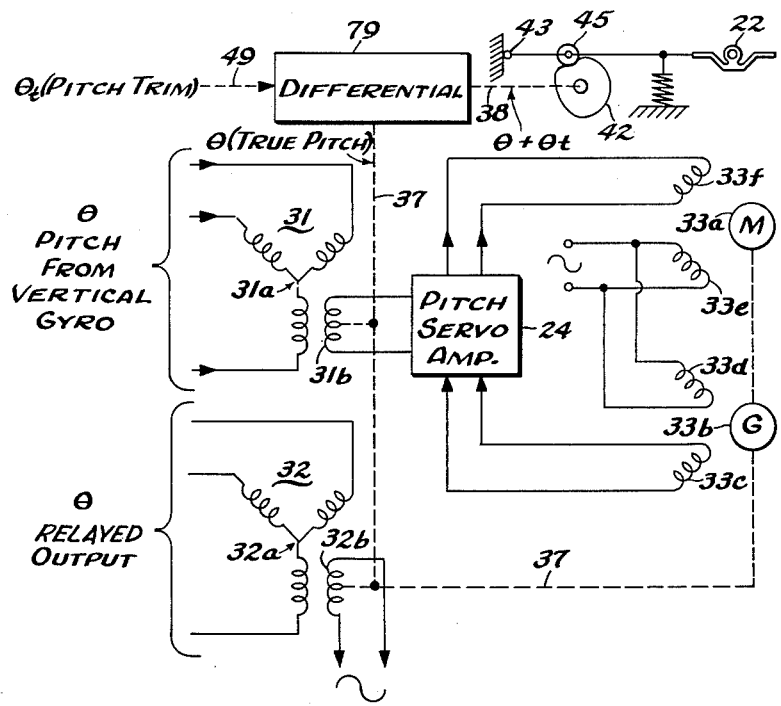
FIGURE 4 is a functional schematic diagram of a type of servo loop which may be employed to position the pitch indicator in accordance with the embodiment of FIGURE 1.

The rotational positioning of shaft 38 may be more clearly described with reference to FIGURE 4 wherein the type of pitch servo loop which may be employed is schematically illustrated and the pitch trim feature is functionally represented. Referring then to FIGURE 4, pitch bar 22 is functionally illustrated as being positioned in accordance with the co-operation between cam follower 45 and cam 42, the cam being rigidly affixed to and rotated with shaft 38. The angular position of shaft 38 is indicated as being $\theta + \theta_t$, where $\theta$ is true pitch from the gyro reference and $\theta_t$ is the modification thereof by the amount of pitch trim to be introduced. Shaft 38 is seen to be the output shaft of a differential designated by reference numeral 79. The differential has a first input shaft designated as 49 whose angular position is indicative of the amount of pitch trim to be inserted. A second input to differential 79 is that of shaft 37, the rotational position of which corresponds to the shaft positions of a pitch motion repeater in the form of synchro 31 and a pitch relaying motion transmitter in the form of synchro 32. The servo system illustrated is conventional and is but an example of one of many types which might be employed. Electrical signals indicative of true pitch $\theta$ from a vertical reference are seen to be connected to the stator windings 31a of pitch synchro 31. Any degree of miscorrespondence between rotor 31b of synchro 31 and the rotor of a corresponding synchro take-off in the vertical gyro is reflected in an error voltage being induced in rotor 31b. This error signal is amplified in pitch servo amplifier 24 and applied as an energizing voltage for motor portion 33a of pitch servo motor-generator 33. The output from pitch servo amplifier 24 is applied to one winding 33f while a second winding 33e is continuously energized from a reference signal source. Motor 33 then positions, through an appropriate gear train and shaft 37, the rotor 31b of pitch synchro 31 to reduce the error signal to zero. The position of shaft 37 is then indicative of true pitch as derived from the vertical gyro. The generator portion of motor generator 33 is included in a well-known manner to provide, through a field winding 33c, a degenerative feedback to pitch servo amplifier 24 to provide the proper degree of damping within the servo system.

It is thus seen that the positioning of pitch indicator 22 is responsive to pitch, as derived from the vertical gyro and modified by a degree of pitch trim. The employment of the differential 79 introduces pitch trim without affecting the true pitch indicativeness of shaft 37. Pitch synchro 32 is positioned by shaft 37 to provide an output indicative of true pitch at all times. Whereas in conventional systems pitch trim is introduced as an electrical bias within pitch servo amplifier 24, it is seen that the present invention enables pitch trim to be introduced independently of the true pitch and thus, regardless of the degree of pitch trim introduced, there is provided a relaying motion transmitter output which is a true duplication of pitch as determined by the vertical gyro. Were pitch trim introduced electrically into the pitch servo amplifier, the entire servo loop would not follow a true pitch condition but rather would zero about true pitch modified by some degree of pitch trim. A conventional system then would not permit the operation of a true pitch relaying motion transmitter in conjunction with the pitch servo system.

Now referring once again to FIGURE 1, it is noted that output shaft 38, to which is rigidly affixed pitch cam 42, is positioned in accordance with the inputs from shafts 49 and 37 as combined differentially. Pitch motor 33 is seen to drive by means of gear 34, gear train 35, and a driven gear 36 which is rigidly attached to differential input shaft 37. Pitch motor 33, as previously discussed, is driven in response to an error output from pitch servo amplifier 24, which error is derived from the lack of correspondence between the rotor of pitch synchro 31 and a positional reference from gyro 70. The differential mechanism is conventional. Input shaft 49 rotates a yoke member 48 on which intermeshing planetary gears 46 and 47 are rotatably supported. Through this co-operation of differential gearing, output shaft 38 is rotated in accordance with the sum of the rotational increments introduced by input shafts 37 and 49. Pitch trim as introduced by input shaft 49 may be traced to output shaft 38 by the motion imparted from yoke 48 to gear 46, gear 46 to gear 47, and gear 47 to gear 40 which is rigidly affixed to shaft 38. The other input is imparted from pitch motor 33 through gear train 35 to gear 36 which is rigidly affixed to shaft 37, through gear 39 also rigidly affixed to shaft 37, and thus through planetary gears 46 and 47 to gear 40 on shaft 38. In the configuration shown, input shaft 37 is coaxial with and concentrically rotatable within output shaft 38. The degree of pitch trim from shaft 49 is added to (or subtracted from) the true pitch attitude as introduced from input shaft 37.

Considering the pitch trim input to the differential as being zero or some fixed amount, it follows that pitch indicator bar 22 is positioned vertically from its reference index in accordance with the pitch attitude of the craft as indicated by the vertical gyro by a conventional motion conversion from rotation to translation. Pitch cam 42, which is affixed to differential output shaft 38 and rotates therewith, is seen to effect a pivot action of pitch arm 44 through the co-operation of cam follower 45 which rides on the periphery of cam 42. This conversion from rotational motion to that of translation is not necessarily linear due to the particular cut of the cam 42 as illustrated. In the particular instrument illustrated, and as described more in detail in the above-cited co-pending application, the actual motion conversion is that of linear rotation into a degree of non-linear translation such that the motion of pitch bar 22 experiences an increase in displacement per degree of pitch in the region of plus or minus 10 degrees climb or dive from a level flight condition. As described in the co-pending application, this is accomplished by cutting the desired curve on cam 42 so as to affect a smoothly decreasing sensitivity with increasing pitch angle.

Now referring to differential input shaft 49, which as previously discussed introduces mechanically a desired pitch trim parameter, it is noted that shaft 49 is rotated through the co-operation of a sector gear 50 with a worm drive 51. Therefore, the action of the primary pitch indicating mechanism is not reflected back through differential input shaft 49 since the worm drive cannot be driven by shaft 49. Differential input shaft 49 is thus effectively held such that the primary input from the pitch motor on shaft 37 is imparted through the differential mechanism to output shaft 38 and the positioning cam 42. Likewise, input to the differential from shaft 49 cannot be imparted back into the primary pitch motor servo link due to the adverse gear ratio in that direction. Input shaft 37 is thus effectively held when considering trim input on shaft 49, and the trim input is reflected through the differential mechanism to output shaft 38 and pitch cam 42. It is further to be noted that should any degree of trim input from shaft 49 be reflected back through the gear train to the pitch motor that the resulting unbalance in the servo loop would automatically return the positioning mechanism to desired correspondence with the controlling vertical gyro.

From the above it is seen that pitch indicator 22 is provided with activating means whereby it is deflected vertically from a reference pitch indication by an amount proportional to the true pitch as taken from the vertical reference and modified by a degree of pitch trim as introduced mechanically by means of shaft 49 through the positioning of worm 51.

Figure 2:
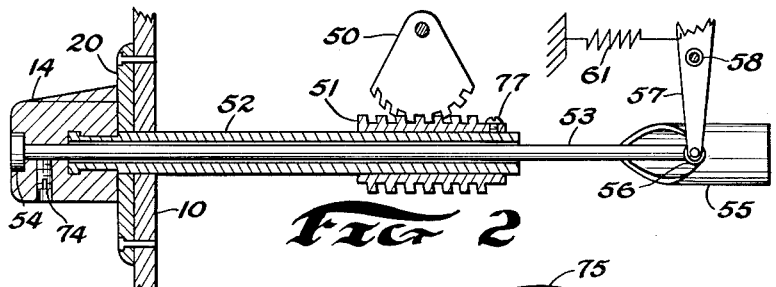
FIGURE 2 is a cross-section of a portion of the mechanical arrangement which depicts one method covered by this disclosure which is used to introduce pitch trim.

Worm 51, with references to FIGURE 1 and FIGURE 2, is seen to be fixed to a shaft 52, which shaft may be rotatably positioned by means of a control knob 14 attached thereto. This shaft is so integrated in a mechanical system to be further discussed in detail that it may be rotated by an arbitrarily desired amount or be automatically positioned to a preset reference condition which corresponds to the introduction of a fixed trim parameter.

In the pitch trim system to be described, means are provided to introduce a fixed or preset trim when the instrument is used in an approach mode of operation, that is, during landing of the aircraft. The trim parameter for an approach mode of operation varies with particular types of aircraft and is fixed at an optimum value for a given type of aircraft. During landing, a characteristic nose-up or nose-down attitude is maintained during descent to ensure the correct attitude on the glide slope. These attitudes, as previously mentioned, are fixed for a particular craft and vary with individual craft. Means are, therefore, also provided such that the degree of fixed pitch trim to be automatically inserted during the approach mode of operation may be readily varied and may, in fact, be preset externally by a mechanic from the control knob on the instrument when the instrument is completely mounted in the airplane instrument panel.

Contrary to the above-discussed fixed pitch trim desired during approach, a degree of flexibility is necessary in the normal cruise mode of flight. Means are, therefore, provided such that the mechanical pitch trim adjustment may be varied arbitrarily by the pilot during cruise flight conditions.

The preset fixed pitch trim is mechanically imparted into the system through the degree of rotation of worm 51 as affected by a detented cam and cam follower action. As indicated most clearly in FIGURE 2, worm 51 is fixed to a hollow shaft 52 by some means such as set screw 77. Hollow shaft 52 is seen to be rotatably supported in front support member 10 of the instrument proper and has rigidly attached to the end thereof a control knob 14. As illustrated, the end of shaft 52 is fluted such that control knob 14 is rigidly affixed thereon. A second shaft 53 is placed concentrically within and rotatable with respect to hollow shaft 52. Shaft 53 is also rigidly affixed to control knob 14 by means of a set screw 74. Thus, as indicated in FIGURE 2, inner shaft 53 rotates with outer shaft 52 and worm 51 when control knob 14 is turned.

A cylindrical cam 55 is affixed to the end of shaft 53 and a cam follower 56 is spring-loaded against the cam surface due to the location of pivot point 58 on arm 57. It is thus seen that any degree of rotation of knob 14 and thus cylindrical cam 55 from the low dwell portion illustrated in FIGURE 2 would have to be made forceably against the spring action of spring 61. The low dwell portion of cam follower 56 thus corresponds to a fixed reference position, which position is indicative of a fixed degree of pitch trim being introduced through sector gear 50 which, as previously discussed, positions input shaft 49 to the differential mechanism. It is evident then from the configuration of FIGURE 2 that, should means be employed whereby cam follower 56 is held away from the face of cylindrical cam 55, an arbitrary amount of pitch trim could be introduced by rotation of control knob 14. Considering this condition to be present, it is noted that if once again cam follower 56 is allowed to spring-load against the cylindrical cam 55, the worm 51 will automatically return to the reference position and thus once again impart a preset degree of fixed pitch trim into the system.

As discussed above, an arbitrary pitch trim adjustment or a fixed reference pitch trim adjustment may be inserted into the system depending upon the flight mode of operation. With reference to FIGURE 1 wherein cylindrical cam 55 is illustrated in the low dwell defined position as in FIGURE 2, it is noted that the necessary action to move cam follower 56 out of the detent on cam 55 is imparted by the action of a second cam follower 59 on arm 57 through the co-operation with a controlling cam 60. As noted, cam follower 59 is at the lower dwell position 80 of cam 60 which allows cam follower 56 on the opposite end of arm 57 to detent in barrel cam 55. Control cam 60 is, therefore, so cut that when it is rotated approximately 300 degrees, cam follower 59 rides up on the cam surface of control cam 60 and thus pivots arm 57 about pivot point 58 to raise cam follower 56 away from the surface of cylindrical cam 55. With this condition the amount of pitch trim introduced may be varied at will by the pilot by rotation of control knob 14 on shaft 52.

As previously stated, the predetermined fixed trim as introduced by the detent action of cylindrical cam 55 in conjunction with cam follower 56 is desirable during approach mode of operation while the arbitrary flexible adjustment to be made by the pilot by rotation of control knob 14 is desired during cruise mode of operation. The modes are seen to be introduced into the mechanical system by a control system which positions control cam 60 either to the position indicated in FIGURE 1 or to a point 300 degrees from the position indicated in FIGURE 1. A shaft 62 is affixed to the axis of control cam 60 and is rotated by means of a gear 63 attached thereto. Gear 63 is positioned through a gear train generally designated by reference numeral 64 in co-operation with gear 65 on the shaft of a pitch trim change motor 66. The energization of pitch trim change motor 66 is effected by limit switch and control circuitry 67 in conjunction with a function selector switch 68, which switch in this particular embodiment is illustrated as being controllable by a cam 13 positioned by a function selector knob 15. A limit switch is included in the control circuitry 67 which, in co-operation with the function switch 68, drives the motor by a sufficient amount such that control cam 60 is rotated 300 degrees before action is interrupted by the limit switch and the motor is de-energized. The limit switch is operated through a mechanical linkage 69 with cam shaft 62. When the pilot changes flight modes of operation by turning function selector knob 15, switch 68 once again initiates energization of pitch trim change motor 66 such that control cam 60 is rotated back again by 300 degrees. The interaction between function selector switch 68 and the limit switch and control circuitry will not be discussed in detail here since any one of a number of well-known expedients might be employed to effect the desired control operation. It is further to be noted that although in this embodiment the function selector control 15 is illustrated as being mounted on the instrument proper, this control switch need not be so mounted, and the necessary switching arrangements for the pitch change motor control might be effected by remote switching and relay networks in any desired manner.

Figure 3:
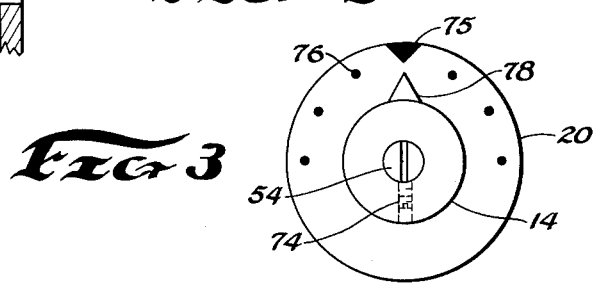
FIGURE 3 is a front view of the control knob by which pitch trim is inserted by the operator.

The above-described system for mechanically introducing pitch trim without affecting the basic servo loop provides a desirable degree of flexibility in initial alignment and zeroing. Both initial alignment and fixed trim pre-settings may be made in a straight forward and direct manner. For this reason, with reference to FIGURE 2, both control knob 14 and worm 51 are seen to be readily positionable with respect to inner shaft 53 and outer shaft 52, respectively, by means of set screws. Set screw 77, which positions worm 51 on outer shaft 52, is provided for use during initial zeroing of the system as at the factory, or upon subsequent zeroing should for some reason the instrument be disassembled and the servo drive broken. With reference to FIGURES 1 and 3, there is provided on the front support member 10 of the instrument an escutcheon plate 20. Plate 20 is fixed to plate 10 and has thereon a zero index 75 and a plurality of index marks 76 on either side of reference 75. Control knob 14 has fixed thereon a reference pointer or mark 78. As shown in FIGURE 2, inner shaft 53 is provided with a slotted head portion 54. Initial zeroing of the servo system is accomplished as follows. Control knob 14 is rotated such that index mark 78 is aligned opposite reference mark 75 on escutcheon 20. Set screw 74 is loosened to permit the rotation of shaft 53 until the screw driver slot in the head 54 is aligned vertically with reference marks 75 and 78 as illustrated in FIGURE 3. Then, with reference to FIGURE 2, cylindrical cam 55 is positioned on shaft 53 such that it is in the low dwell defined position with respect to cam follower 56 as illustrated. Cam 55 is locked in this position by means of a clamp or other means (not illustrated). Set screw 77 is then loosened and worm 51 is rotated with respect to shaft 52 such that the degree of pitch trim introduced through shaft 49 is zero. Worm 51 is then locked in this position.

After initial zeroing, zero pitch trim is introduced and this condition is indicated by index 78 on control knob 14 beng positioned opposite zero reference mark 75 on escutcheon 20. At this point, the pilot during the cruise mode of operation as discussed above may arbitrarily rotate control knob 14 to any desired degree of pitch trim as read from reference marks 76 on conjunction with index mark 78 on control knob 14. The degree of pitch trim may then be read directly from the escutcheon, each reference mark 76 representing a pre-established degree of pitch, it being understood that those reference marks 76 on either side of zero mark 75 indicate pitch-up or pitch-down attitude, respectively.

Now, as discussed above, a desired degree of predetermined trim for the approach mode may be easily made from the front face of the instrument. The procedure is as follows. Knob 14 and thus worm gear 51 may be rotated to a desired pitch trim as indicated by the correspondence between index 78 and a given reference mark 76 on escutcheon 20. It is to be noted that this setting rotates worm 51 through outer shaft 52 and also rotates cylindrical cam 55 through inner shaft 53. Inner shaft 53 is thus rotated away from its zero pitch trim detented position as originally set. At this point, control knob 14 is held at the desired reference 76 while set screw 74 is then loosened and the slot on the end 54 of inner shaft 53 is once again aligned in an up-and-down position.

The predetermined zero position is now moved to a detent fixed trim position. Set screw 74 is then tightened such that inner shaft 53 rotates once again with worm 51. Now should control knob 14 be rotated away from this detent position as during the cruise mode previously discussed, a switch to approach mode and subsequent detenting action of cam follower 56 on cylindrical cam 55 will cause worm 51 to be rotated back to this preset trim position and introduce through sector gear 50 and shaft 49 the predetermined amount of pitch trim into the system.

It is seen that by this invention an aircraft instrument is provided wherein arbitrarily selected or predetermined pitch trim parameters may be introduced and yet allow the incorporation of relaying motion transmitters which are true attitude indicative devices and which may serve as secondary gyro sources for incorporation with auxiliary equipment on the aircraft.

Figure 5:
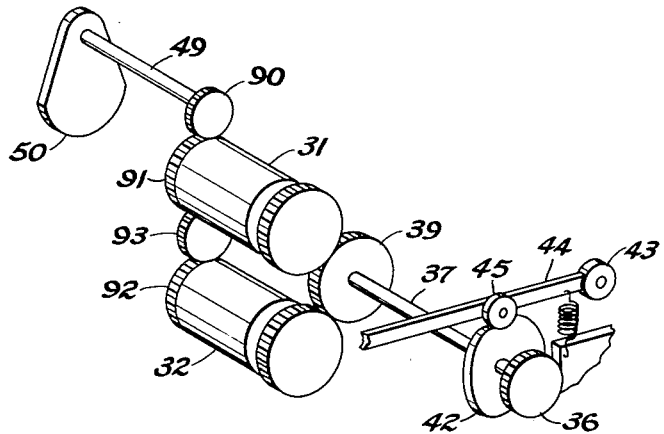
FIGURE 5 is a mechanical diagram of the pitch trim mechanism as might be embodied in the system shown in FIGURE 6.
Figure 6:
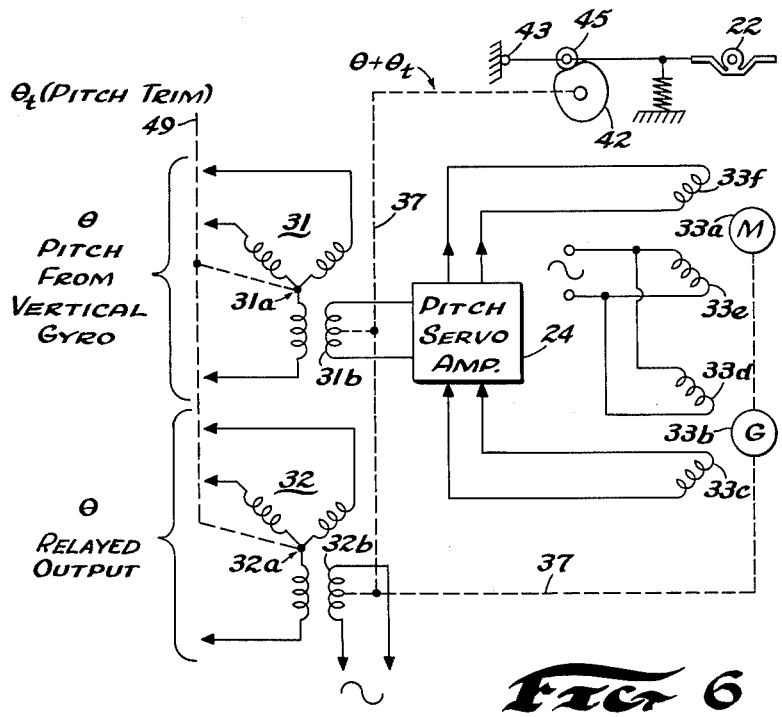
FIGURE 6 is a functional schematic diagram of a second type of servo loop which may be employed to position the pitch indication.

FIGURES 5 and 6 illustrate another embodiment of this invention whereby pitch trim may be differentially introduced into the system while allowing the relaying motion transmitter to maintain a true pitch indicativeness. In this embodiment, with reference to FIGURE 6, it is seen that shaft 49, which is positioned in accordance with the above-discussed means to a position indicative of the pitch trim parameter, is utilized again to differentially introduce the pitch parameter by mechanically rotating the stators 31a and 32a of pitch motion repeater 31 and relaying motion transmitter 32, respectively. The rotors of pitch motion repeater 31 and relaying motion transmitter 32 are, as shown, positioned in accordance with the rotational input from shaft 37 through its driving motor 33. It is to be noted in this embodiment that the pitch cam 42 is now rigidly affixed to shaft 37 and, therefore, rotates in accordance with the rotation of rotors 31b and 32b, respectively. As before, an electrical signal indicative of true pitch from vertical gyro 70 is introduced in the stator 31a of pitch motion repeater 31. Any degree of miscorrespondence between the rotor 31b of motion repeater 31 and the rotor of the associated motion transmitter in the vertical gyro results in an error signal being induced into the rotor 31b of motion repeater 31. This error signal is amplified in pitch servo amplifier 24 and applied as an energizing signal to pitch motor-generator 33. The motor rotates to re-position the rotor 31b of pitch motion repeater 31 to a null. Pitch indicator 22, through the co-operation of cam follower 45 and pitch cam 42, is thereby positioned in accordance with the pitch attitude as derived from the vertical gyro.

Pitch trim may then be introduced through shaft 49 by rotating the stators 31a and 32a of pitch motion repeater 31 and relaying motion transmitter 32 by an amount proportional to the pitch trim parameter. The rotation of the stators instantaneously unbalances the servo system and the resulting error voltage induced in the rotor 31b of pitch motion repeater 31 excites pitch motor-generator 33 to re-position the rotors of pitch motion repeater 31 and relaying motion transmitter 32 by an increment equal to the pitch trim parameter. Shaft 37 is, therefore, rotated by this additional parameter and its position is indicative of true pitch $\theta$ as derived from the vertical reference ± pitch trim $\theta_t$ as introduced mechanically by rotation of shaft 49. It is to be noted that in this embodiment shaft 37 is rotated in accordance with $\theta + \theta_t$ and thus contrary to the embodiment of FIGURE 1, the servo system is not entirely independent of the introduction of the pitch trim parameter. However, it is to be noted that by introducing the pitch trim parameter $\theta_t$ by mechanical rotation of the stators of motion repeater 31 and relaying motion transmitter 32 in the manner illustrated that the rotors automatically follow by the same $\theta_t$ parameter and, therefore, the relative angle between the rotor and the stator of the relaying motion transmitter 32 is maintained in accordance with true pitch $\theta$. Therefore, an electrical output taken from the stator of transmitter 32 is indicative of true pitch $\theta$ and may be used as an auxiliary basic attitude transmitter.

The particular mechanical arrangement for the system of FIGURE 6 is illustrated in FIGURE 5. The comparison between FIGURE 5 and FIGURE 1 illustrates that the mechanical arrangement is similar, being modified by the elimination of the mechanical differential mechanism of FIGURE 1. Input shaft 49 is positioned by sector gear 50 which, as in FIGURE 1, is rotated in accordance with worm 51 on shaft 52. A gear 90 is affixed to shaft 49 and drives gear 91 on the stator of pitch motion repeater 31 thereby positioning the stator thereof in accordance with the pitch trim parameter. Gear 91, in turn, drives a gear 92 on the stator of relaying motion transmitter 32 through an idler gear 93. The rotors 31a and 32a of members 31 and 32 are positioned as in FIGURE 1 by means of gears co-operating with gear 39 on shaft 37. Shaft 37 is rotated by means of gear 36 in co-operation with a gear train from the pitch motor-generator 33 as in FIGURE 1. It is to be noted that pitch cam 42 is rigidly affixed to and rotates with shaft 37 in the embodiment of FIGURE 5.

Thus, means are illustrated in FIGURES 5 and 6 whereby the pitch trim parameter may by mechanical means be differentially introduced into the system such that the pitch indicator 22 is indicative of true pitch modified by pitch trim but that an electrical output from pitch relaying motion repeater 32 remains indicative of true pitch only.

It should be noted that although the motion repeaters and transmitters illustrated and discussed in conjunction with the above-discussed servo systems are of the synchro type, the invention is not so limited. Potentiometer or other type motion repeaters may equally as well be employed in conjunction with a vertical gyro of the type having a potentiometer or other type take-off device.

In FIGURE 1, the described instrument is indicated functionally in conjunction with the type of external signal sources from which the various flight indications may be formulated. The glide slope receiver 83 provides a deviation signal to glide slope meter 17 to effect movement of glide slope pointer 12. A vertical gyro 70, in addition to supplying the discussed atitude indicative electrical signals into the bank and pitch servo loops, provides an input to a computer 71. Computer 71 receives inputs from a navigation receiver 72 and a course indicator 73 to derive a composite steering signal to energize steering meter 21 for deflection of steering pointer 23. Course indicator 73 is illustrated as being tied in with a stabilized magnetic compass 82 and heading card servo amplifier 81 to derive steering signal parameters which are introduced into computer 71 for the subsequent formulation of a composite steering signal output.

Although this invention has been described with respect to particular embodiments thereof, it is not to be so limited as changes and modifications may be made therein which are within the full intended scope of the invention as defined by the appended claims.

What is claimed is:

1. In an aircraft instrument of the type including a pitch angular motion repeater servo positioned in accordance with a vertical reference associated motion transmitter, which motion repeater positions an indicator indicative of pitch attitude, and including a pitch trim control to modify said pitch indication by a pitch trim parameter means for mechanically inserting said pitch trim parameter without affecting said servo positioned motion repeater comprising a mechanical differential having an output shaft and first and second input shafts, said first input shaft being connected to and positioned in accordance with said pitch motion repeater, first mechanical means operable by said pitch trim control to supply an input to said second differential input shaft proportional to said pitch trim parameter, said differential output shaft being operably connected to said pitch indicator, switching means having a plurality of selectable positions, second mechanical means responsive to a first position of said switching means to engage and move said first mechanical means to a predetermined position, said second mechanical means being responsive to a second position of said switching means to disengage from said first mechanical means.

2. In an aircraft instrument of the type including a servo positioned pitch attitude motion repeater to position an indicator indicative of pitch attitude, and including means for insertion of a pitch trim parameter; means for mechanically inserting said pitch trim parameter comprising a mechanical differential having an output shaft and first and second input shafts, said first differential input shaft being connected to and rotated in accordance with the position of said pitch motion repeater, a pitch trim control shaft, a pitch trim control knob fixed to said control shaft, cam means including a camming surface having a low dwell thereon, said camming means fixed to said control shaft, means for mechanically imparting the rotational position of said control fixed to said second differential input shaft, a cam follower co-operating with said camming means, mechanical positioning means connected to said cam follower for selectively engaging said cam follower with said camming means, switch control means for activating said mechanical positioning means, said switch control means having a first position and a second position, the first position of said switch control means controlling said mechanical positioning means to effect rotation of said control shaft to a predetermined position defined by engagement of said cam follower in said low dwell portion of said camming means, the second position of said switch control means controlling said mechanical positioning means to effect disengagement between said cam follower and said camming means, said control shaft being selectively positionable by rotation of said pitch trim control knob with said switch control means in said second position, and the differential output shaft being mechanically connected to said pitch attitude indicator.

3. In an aircraft flight instrument of the type comprising indicating means responsive to pitch attitude, said indicating means including an angular motion repeater connected to and positioned in accordance with a corresponding pitch attitude motion transmitter, and including means for inserting a pitch trim parameter; means for mechanically inserting said pitch trim parameter comprising differential means having an output shaft and first and second input shafts, said motion repeater rotatably connected to said first differential input shaft, first control means, first mechanical means responsive to said control means supplying a rotational input to said second differential input shaft in the form of a pitch trim parameter, the output shaft of said differential being operably connected to a pitch attitude indicator, second control means having a plurality of selectable positions, mechanical setting means connected to said first mechanical means, positioning means operable by said second control means to position said mechanical setting means, a first position of said second control means controlling said positioning means to move said mechanical setting means to disengage with said first mechanical means, and a second position of said second control means controlling said positioning means to operate said mechanical setting means to engage and move said first mechanical means to a predetermined position.

4. In an aircraft instrument of the type including a servo positioned pitch attitude motion repeater connected to and responsive to a pitch motion transmitter, an indicator connected to said motion repeater and positioned in accordance therewith, and including means for inserting a pitch trim parameter; means for inserting said pitch trim parameter comprising differential means having an output shaft and first and second input shafts, said first differential input shaft being connected to and rotated in accordance with the position of said pitch motion repeater, a first control shaft, a pitch trim control knob fixed to one end of said first control shaft, first camming means including a symmetrically disposed low dwell surface portion, said first camming means fixed to the other end of said first control shaft, means for mechanically imparting the rotation of said first control shaft to said second differential input shaft, a cam follower arm having first and second cam followers mounted on opposing ends thereof, said arm being pivotally supported about a point between said cam followers, the first cam follower cooperating with said first camming means, a second control shaft, second camming means mounted on said second control shaft, said second cam follower being positioned by said second camming means, spring means for loading said first and second cam followers against said first and second camming means respectively, motor drive means connected to said second control shaft, multi-positioned control means connected to said motor drive means, a first position of said control means effecting rotation of said second camming means to pivot said cam follower arm for disengagement between said first cam follower and said first camming means, a second position of said control means effecting rotation of said second camming means to pivot said cam follower arm to effect engagement between said first cam follower and said low dwell portion of said first camming means, said first control shaft being rotated to a predetermined position during said second position of said control means, said first control shaft being arbitrarily positionable by said pitch trim control knob during said first position of said control means, and the differential output shaft being mechanically connected to said pitch indicator.

References Cited in the file of this patent

UNITED STATES PATENTS

| | | |
|---|---|---|
| 2,696,597 | Chombard | Dec. 7, 1954 |
| 2,713,156 | Guarino | July 12, 1955 |
| 2,732,550 | Reedy | Jan. 24, 1956 |